United States Patent [19]
Sumiyoshi

[11] Patent Number: 5,734,358
[45] Date of Patent: Mar. 31, 1998

[54] INFORMATION DISPLAY DEVICE FOR MOTOR VEHICLE

[75] Inventor: Kenjiro Sumiyoshi, Omiya, Japan

[73] Assignee: Kansei Corporation, Omiya, Japan

[21] Appl. No.: 676,912

[22] Filed: Jul. 8, 1996

Related U.S. Application Data

[63] Continuation of Ser. No. 399,369, Mar. 6, 1995, abandoned.

[30] Foreign Application Priority Data

| Mar. 18, 1994 | [JP] | Japan | 6-048164 |
| Mar. 23, 1994 | [JP] | Japan | 6-051861 |

[51] Int. Cl.$^6$ ............................................. G09G 5/00
[52] U.S. Cl. .......................... 345/7; 345/9; 340/980; 359/630
[58] Field of Search ...................... 345/1, 7, 8, 9, 345/4, 22; 340/461, 462, 980; 359/630, 631, 13, 14; 348/113, 115, 121, 783

[56] References Cited

U.S. PATENT DOCUMENTS

| 3,603,667 | 9/1971 | Freeman | 345/7 |
| 4,623,223 | 11/1986 | Kempf | 348/783 |
| 4,635,033 | 1/1987 | Inukai et al. | 345/7 |
| 4,711,544 | 12/1987 | Iino et al. | 345/7 |
| 4,723,160 | 2/1988 | Connelly | 345/9 |
| 4,908,611 | 3/1990 | Iino | 345/7 |
| 4,925,272 | 5/1990 | Ohshima et al. | 345/7 |
| 5,032,828 | 7/1991 | Hirose et al. | 345/22 |

FOREIGN PATENT DOCUMENTS

| 39 04 401 A1 | 8/1989 | Germany . | |
| 43 20 129 A1 | 12/1993 | Germany . | |
| 3-68992 | 3/1991 | Japan | 345/1 |
| 4-184382 | 7/1992 | Japan . | |

Primary Examiner—Dennis-Doom Chow
Attorney, Agent, or Firm—Foley & Lardner

[57] ABSTRACT

An information display device comprises a housing installed in an instrument panel of a motor vehicle. The housing has a window opening facing toward the vehicle cabin. A first display device is installed in the housing and has a screen on which a first image is displayed. A second display device is installed in the housing and has a screen on which a second image is displayed. A half mirror is installed and inclined in the housing in a manner to cover the screens of both the first and second display devices, so that the image forming light beams from the screens are reflected backward by the half mirror. A concave mirror is installed in the housing behind the half mirror, so that the image forming light beams from the half mirror are reflected forward by the concave mirror. The first and second display devices are positioned at laterally spaced positions in the housing, so that first and second virtual magnified images produced by the respective light beams from the concave mirror can be viewed or recognized from only two positions respectively.

20 Claims, 7 Drawing Sheets

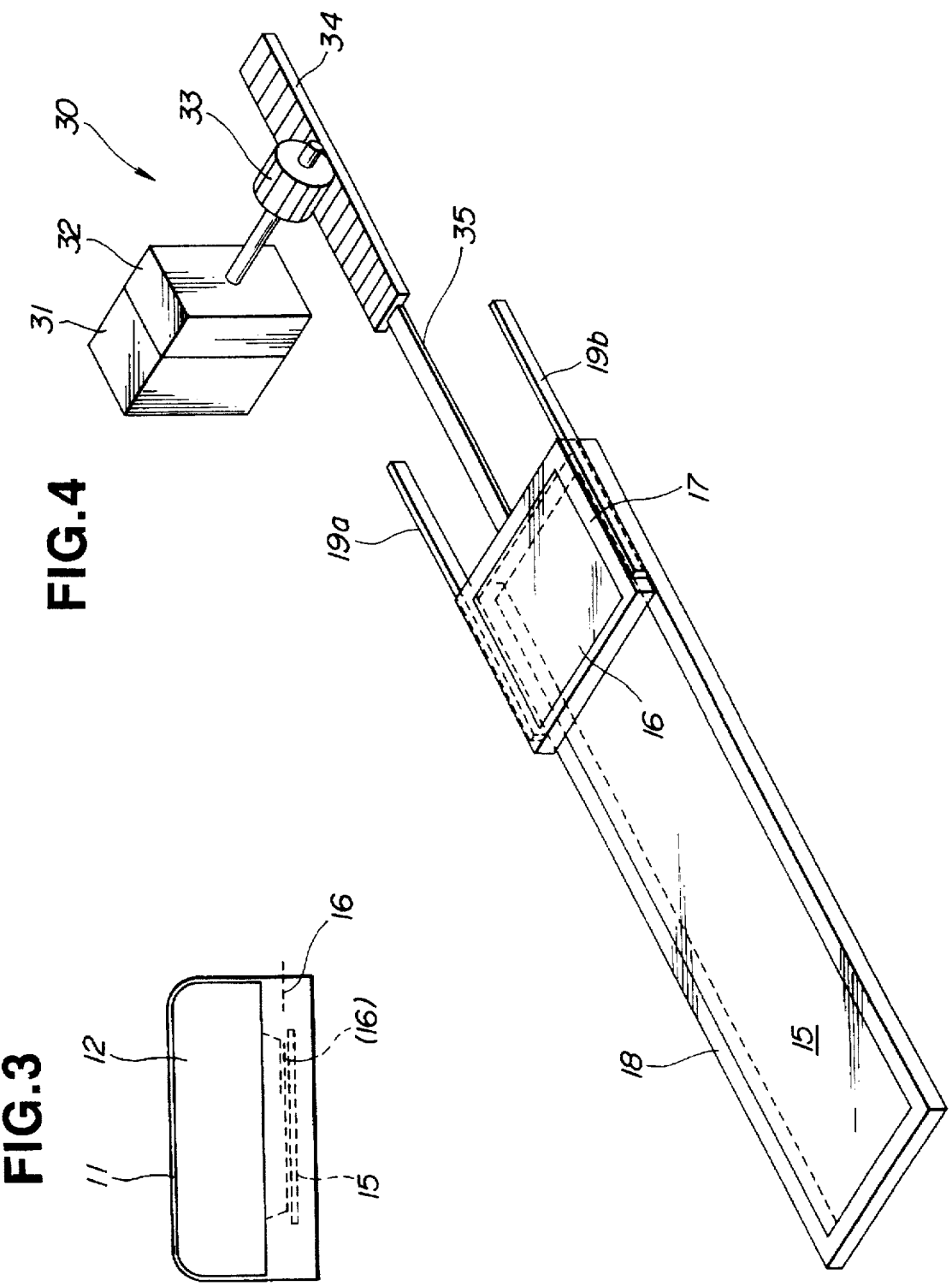

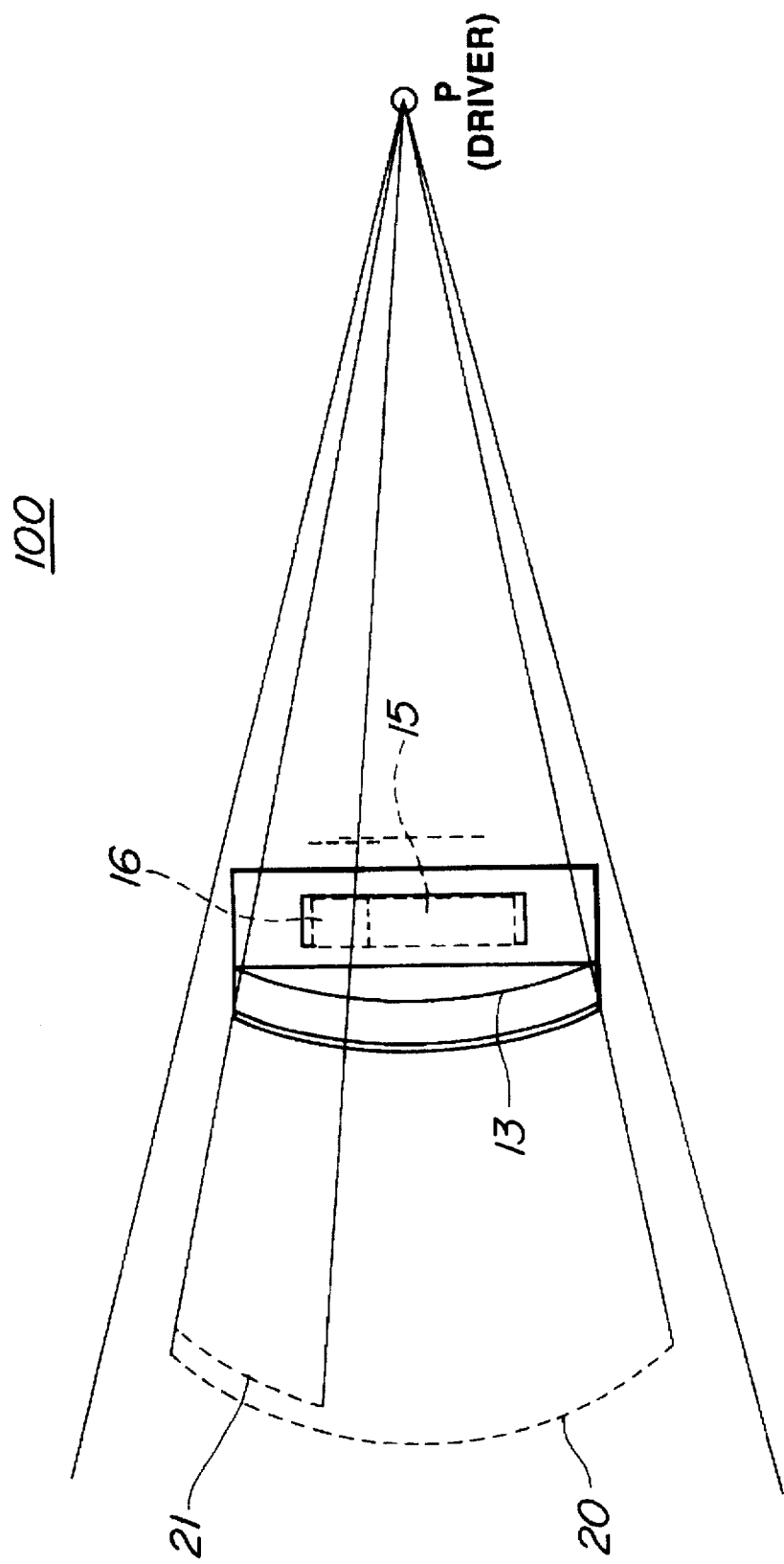

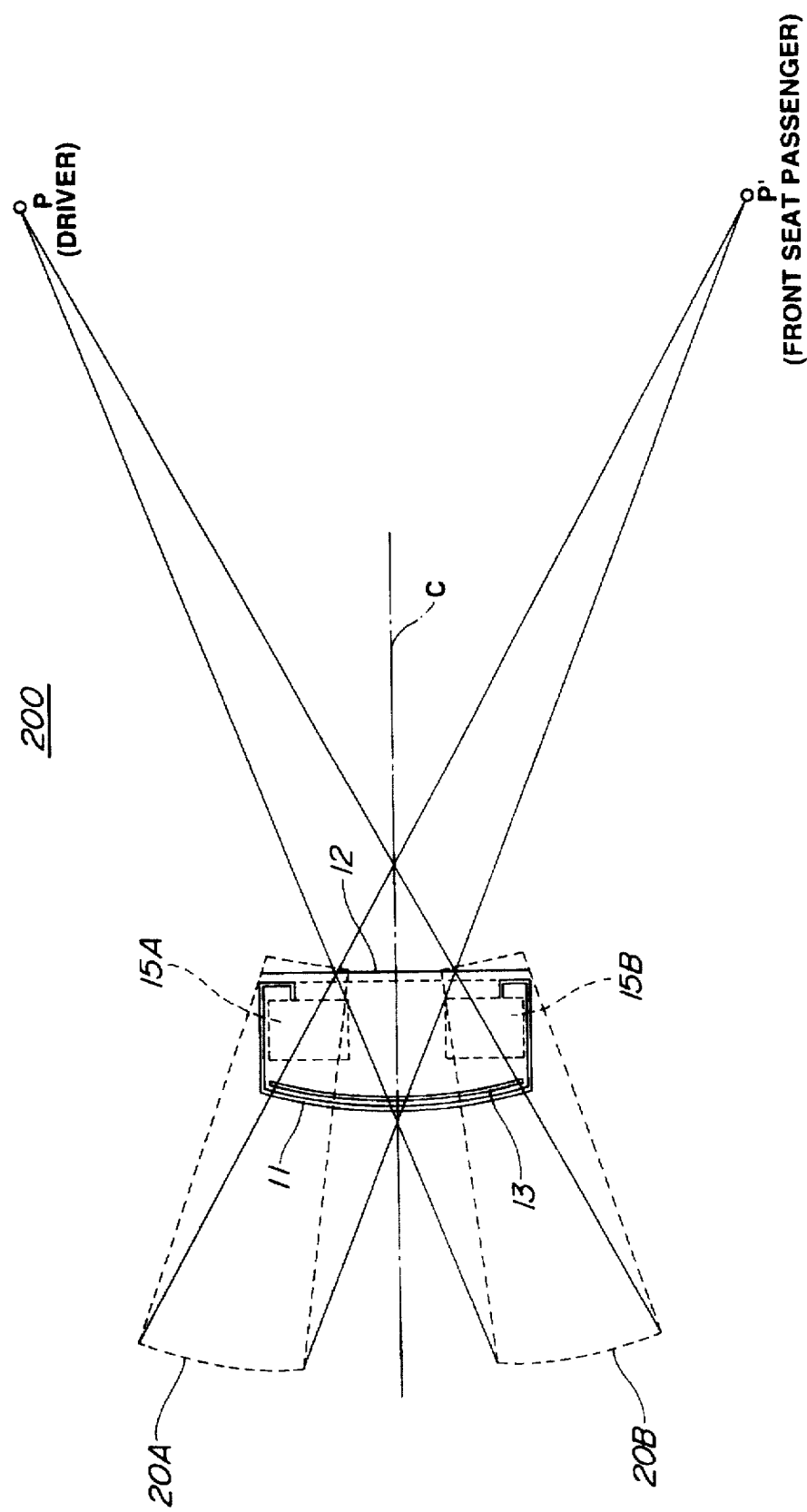

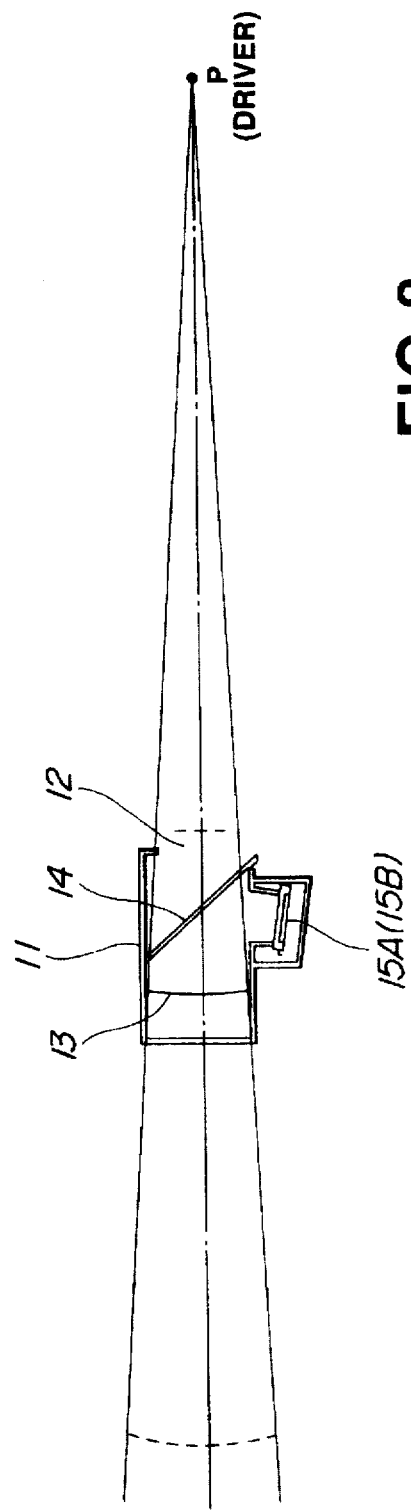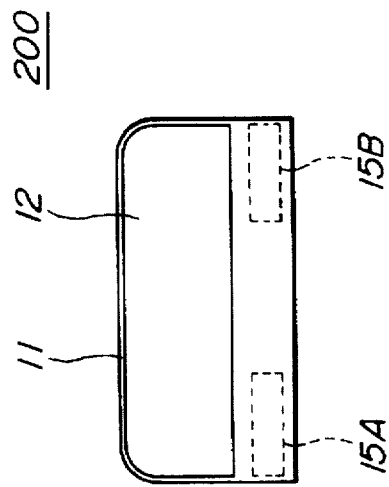

INFORMATION DISPLAY DEVICE FOR MOTOR VEHICLE

This application is a continuation of application Ser. No. 08/399,369, filed Mar. 6, 1995, now abandoned.

BACKGROUND OF THE INVENTION

1. Field of the Invention

The present invention relates in general to information display devices for a motor vehicle or the like, and more particularly to the information display devices of a type which comprises a display device having a small screen on which visual information is displayed and an optical magnifying system providing a viewer, that is, driver or the like, with an optically magnified image of the displayed information on the screen.

2. Description of the Prior art

In order to clarify the task of the present invention, one conventional information display device for a motor vehicle will be described in brief with reference to FIGS. 9 and 10 of the accompanying drawings.

In FIG. 9, designated by numeral 1 is an instrument panel of a motor vehicle, which has a display device mounting space 2 formed therein. Within the space 2, there is installed a housing 11 having a window opening directed toward the vehicle cabin. Within the housing 11, there is laid a display device 3 which displays on its screen various information needed by the driver, such as, vehicle speed, engine speed, coolant temperature, fuel residual quantity and the like. A half mirror 4 is positioned above the display device 3 and inclined relative to the screen of the device 3. The image on the screen, viz., the information displaying light beam from the screen is thus reflected backward, that is, leftward in the drawing, by the half mirror 4. A concave mirror 5 is positioned behind the half mirror 4 for magnifying the reflected image traveling from the half mirror 4. The magnified image is thus directed toward an eye point "P" of a driver through the half mirror 4. The half mirror 4 and the concave mirror 5 thus constitute an optical magnifying system 6. Designated by numeral 7 is an indicator drive device which drives indicators on the screen of the display device 3. One of the indicators is illustrated, which is denoted by numeral 8. Thus, a magnified virtual image 10 of the displayed information on the screen appears ahead of the instrument panel 1, which can be viewed by the driver. Denoted by numeral 9 is a transparent cover which covers a front portion of the display device, as shown.

However, due to its inherent construction, the above-mentioned conventional information display device has a drawback. That is, to a front seat passenger (viz., the passenger sitting beside the driver's seat), it is difficult to view the virtual image 10 provided by the display device. This is inconvenient particularly when the front seat passenger is an instructor who is teaching the driving technique to the driver.

SUMMARY OF THE INVENTION

It is therefore an object of the present invention to provide an information display device for a motor vehicle, which is free of the above-mentioned drawback.

According to the present invention, there is provided an information display device for use in a motor vehicle having an instrument panel. The information display device comprises a housing installed in the instrument panel, the housing having a window opening which faces toward the vehicle cabin; a first display unit installed in the housing and having an upward facing screen on which a first image is displayed; a second display unit installed in the housing and having an upward facing screen on which a second image is displayed; a half mirror installed and inclined in the housing and positioned above both of the first and second display units in a manner to cover the screens of both the first and second display units, so that the image forming light beams from the respective screens of the first and second display units are reflected toward the front of the vehicle by the half mirror; and a concave mirror installed in the housing to reflect the image forming light beams from the half mirror, toward the vehicle cabin through the window opening, the reflected image forming light beams from the concave mirror produce respective magnified virtual images of the first and second images wherein the respective screens of the first and second display units are laterally spaced with respect to the vehicle cabin, so that the magnified virtual image of the first image can be viewed from only the first given position and the magnified virtual image of the second image can be viewed from only the second given position.

BRIEF DESCRIPTION OF THE DRAWINGS

Other objects and advantages of the present invention will become apparent from the following description when taken in conjunction with the accompanying drawing, in which:

FIG. 3 is a schematic front view of the information display device of the first embodiment;

FIG. 4 is a perspective view of a display moving mechanism employed in the information display device of the invention;

FIG. 5 is an illustration of the information display device of the first embodiment, which is taken from the direction in which a screen is viewed;

FIG. 6 is a schematic plan view of an information display device of a second embodiment of the present invention, with the visual field provided by the device;

FIG. 7 is a schematic side view of the information display device of the second embodiment, with the visual field provided by the device;

FIG. 8 is a schematic front view of the information display device of the second embodiment;

DETAILED DESCRIPTION OF THE INVENTION

Figure 1:
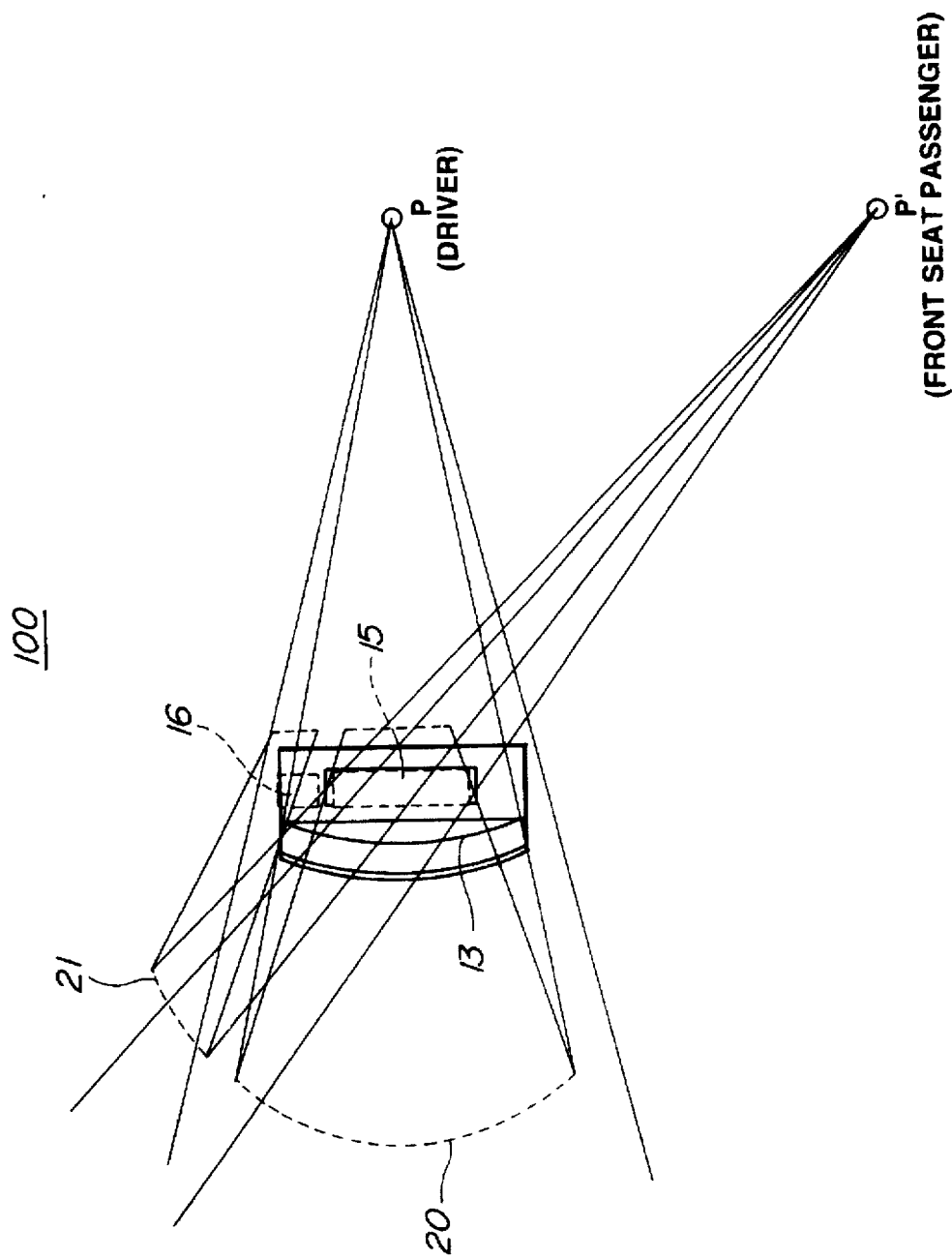
FIG. 1 is a schematic plan view of an information display device of a first embodiment of the present invention, with the visual field provided by the device.
Figure 2:
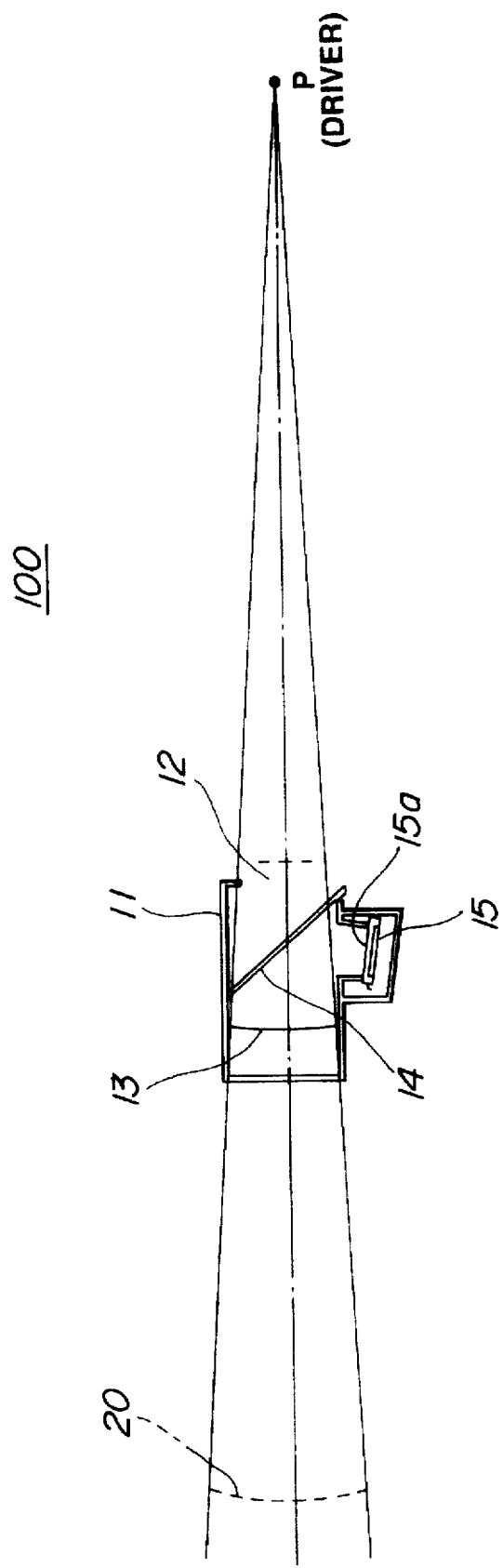
FIG. 2 is a schematic side view of the information display device of the first embodiment, with the visual field provided by the device.

Referring to FIGS. 1 to 3, there is shown an information display device of a first embodiment of the present invention, which is generally designated by numeral 100.

Figure 9:
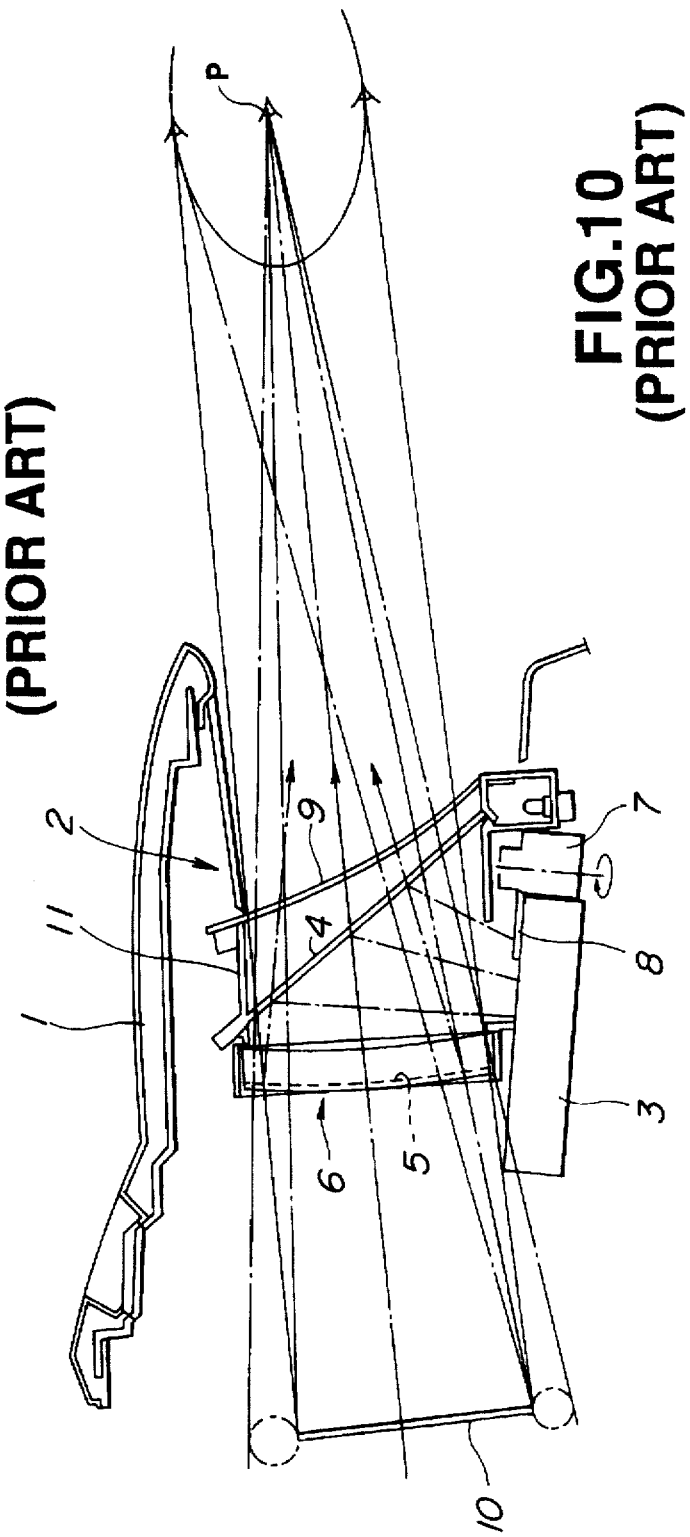
FIG. 9 is a schematically illustrated sectional view of a conventional information display device.
Figure 10:
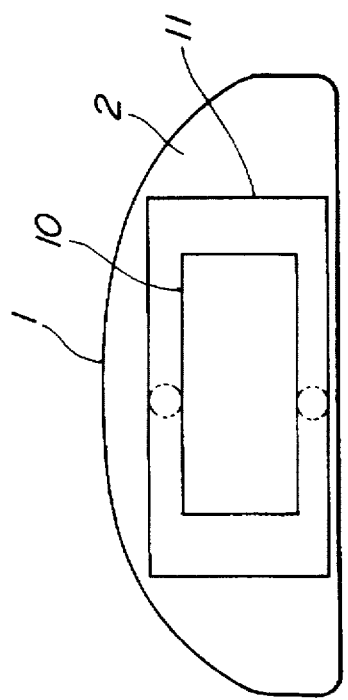
FIG. 10 is schematic front view of the conventional information display device.

In FIG. 2, designated by numeral 11 is a housing which is to be mounted in the display device mounting space 2 (see FIG. 9) formed in the instrument panel 1. The housing 11 has a window opening 12 which faces toward the vehicle cabin. A concave mirror 13 is arranged in a depth portion of the housing 11. A half mirror 14 is arranged in the housing 11 between the window opening 12 and the concave mirror 13 and inclined relative to the housing 11.

Below the half mirror 4, there is arranged a fixed display unit 15 which has a screen 15a on which information is displayed. The display unit 15 comprises a liquid crystal display which displays various information needed by the driver, such as, vehicle speed, engine speed, coolant temperature, fuel residual quantity and the like.

As is seen from FIGS. 1, 3, 4 and 5, a movable display unit 16 is arranged beside the fixed display device 15. The movable display unit 16 comprises a liquid crystal display which may display TV and/or a navigation map.

As is best shown in FIG. 4, the movable display unit 16 has a rectangular frame 17 mounted thereabout. The movable display unit 16 is slidably disposed on parallel rails 19a and 19b which are secured to one end of the frame structure 18 of the fixed display unit 15. As shown, the parallel rails 19a and 19b extend longitudinally beyond the end of the frame structure 18, so that the display unit 16 can move between a first position as shown in the drawing and a second position which is far from the operative position. That is, in the first position, the movable display unit 16 is positioned above a given end portion of the screen 15a of the fixed display unit 15. Thus, the given end portion of the fixed display unit 15 is concealed by the movable display unit 16. While, in the second position, the movable display unit 16 is positioned just beside the fixed display unit 15 exposing the given end portion of the display unit 15.

As is understood from FIG. 1, upon assembly in a motor vehicle having a steering wheel at the right side, the information display device 100 is so oriented that the movable display unit 16 is positioned at a right side of the information display device when viewed by the driver. Furthermore, when assuming the second position as shown in FIG. 1, the movable display unit 16 is positioned near the right edge of the concave mirror 13 for the reason which will be apparent hereinafter.

A drive mechanism 30 is further employed for driving the movable display unit 16. The mechanism 30 comprises an electric motor 31, a speed reduction gear 32 operatively connected to the motor 31, a pinion 33 disposed on an output shaft of the speed reduction gear 32, a rack 34 meshed with the pinion 33 and a connector 35 connecting the rack 34 with the movable display unit 16. That is, when the motor 31 is energized to rotate in one or the other direction, the rack 34 is moved forward or rearward thereby to move the movable display unit 16 between the first and second positions.

If desired, a lift mechanism may be employed. That is, upon coming to the second position, the movable display unit 16 is moved down in the direction of the thickness of the fixed display unit 15 so that the screen of the movable display unit 16 becomes flush with the screen of the fixed display unit 15.

In the following, operation of the information display device 100 will be described with reference to FIGS. 1 and 2.

For ease of understanding, the description will be commenced with respect to a condition wherein the movable display unit 16 assumes the second position as shown in FIG. 1. That is, in this condition, the movable display unit 16 is positioned just beside the fixed display unit 15 exposing the given end portion of the fixed display unit 15.

When now the fixed display unit 15 is energized, a visual information or image is displayed on the screen 15a. The information displaying light beam from the screen 15a is reflected backward by the half mirror 14 and then reflected forward by the concave mirror 13 thereby to produce a magnified virtual image 20 which can be viewed by the driver (more specifically, the eye point "P" of the driver) through the half mirror 14 and the window opening 12.

When then the movable display unit 16 assuming the second position is energized, a visual information or image is displayed on the screen of the movable display unit 16. Similar to the case of the above-mentioned fixed display unit 15, the information displaying light beam from the screen is reflected backward by the half mirror 14 and then reflected forward by the concave mirror 13 thereby to produce a magnified virtual image 21. Due to the nature of the positional relationship between the movable display unit 16, the concave mirror 13 and the eye point "P" of the front seat passenger, the magnified virtual image 21 can be viewed by only the front seat passenger, as is understood from FIG. 1.

Thus, when both the fixed and movable display units 15 and 16 are kept energized, the driver can recognize only the virtual image 20 needed by him or her, and the front seat passenger can watch only the virtual image 21 (TV program) enjoyed by him or her.

When the virtual image 21 for the front seat passenger shows information needed by the driver, the front seat passenger can recognize the existing condition of the vehicle. This is very convenient when he or she is an instructor who is teaching the driving technique to a beginning driver.

When the drive mechanism 30 is energized to rotate in a given direction, the movable display units 16 is moved to the first position as shown in FIG. 5. Under this condition, the magnified virtual image 21 provided by the movable display unit 16 can be viewed by only the driver due to the nature of the positional relationship between movable display unit 16, the concave mirror 13 and the eye point "P" of the driver. Thus, when both the fixed and movable display units 15 and 16 are kept energized, the driver can recognize both the virtual image 20 provided by the fixed display unit 15 and the virtual image 21 provided by the movable display unit 16.

Of course, when the vehicle is running, the image 21 provided by the movable display unit 16 should show information really needed by the driver, such as a map for car navigation or the like.

Referring to FIGS. 6 to 8, there is shown an information display device of a second embodiment of the present invention, which is generally designated by numeral 200.

In FIG. 7, designated by numeral 11 is a housing which is to be mounted in the display device mounting space 2 (see FIG. 9) formed in the instrument panel 1. The housing 11 has a window opening 12 which faces toward the vehicle cabin. A concave mirror 13 is arranged in a depth portion of the housing 11. A half mirror 14 is arranged in the housing 11 between the window opening 12 and the concave mirror 13 and inclined relative to the housing 11.

Below the half mirror 4, there are arranged first and second fixed display units 15A and 15B. The first display unit 15A comprises a liquid crystal display which may display TV and/or a navigation map, while the second display device 15B comprises a liquid crystal display which may display various information really needed by the driver.

As is understood from FIG. 6, upon assembly in a motor vehicle having a steering wheel at the right side, the information display device 200 is so oriented that the first and second fixed display units 15A and 15B are positioned at right and left sides in the housing 11 when viewed from a rear position of the device 200. Designated by reference "C"

is a center line which travels through the center of the housing 11. As shown, the first and second display units 15A and 15B are positioned near the right and left edges of the concave mirror 13 for the reason which will be apparent hereinafter.

In the following, operation of the information display device 200 will be described with reference to FIG. 6.

When only the second display unit 15B is energized, a visual information or image needed by the driver is displayed on the screen of the unit 15B. The information displaying light beam from the screen is reflected backward by the half mirror 14 and then reflected forward by the concave mirror 13 thereby to produce a magnified virtual image 20B which can be viewed by only the driver through the half mirror 14 and the window opening 12.

When then the first display unit 15A is energized, a visual information or image, such as TV program, is displayed on the screen of the unit 15A. The information displaying light beam from the screen is reflected backward by the half mirror 14 and then reflected forward by the concave mirror 13 thereby to produce a magnified virtual image 20A which can be viewed by only the front seat passenger through the half mirror 14 and the window opening 12.

That is, due to the nature of the positional relationship between the two display units 15A and 15B, the concave mirror 14, the eye point "P" of the driver and the eye point "P'" of the front seat passenger, the virtual image 20B can be viewed by only the driver and the other virtual image 20A can be viewed by only the front seat passenger as is described hereinabove.

When the virtual image 20A for the front seat passenger shows information needed by the driver, the front seat passenger can recognize the exixting condition of the vehicle. This is very convenient when he or she is an instructor who is teaching the driving technique to a beginning driver.

When the front seat passenger is not present, the first display unit 15A is deenergized. Of course, in this case, there is no image provided by the first display unit 15A.

What is claimed is:

1. In a motor vehicle having an instrument panel at a front portion of a vehicle cabin and first and second given positions in the vehicle cabin, said first and second given positions being laterally spaced with respect to the vehicle cabin, an information display device comprising:

a housing installed in said instrument panel, said housing having a window opening which faces toward the vehicle cabin;

a first display unit installed in said housing and having an upward facing screen on which a first image is displayed;

a second display unit installed in said housing and having an upward facing screen on which a second image different from said first image is displayed;

an inclined half mirror installed in said housing, said half mirror being positioned above both said first and second display units, so that image forming light beams from the respective screens of the first and second display units are reflected toward a front of said vehicle by the half mirror; and a concave mirror installed in said housing to reflect said image forming light beams from said half mirror toward the vehicle cabin through said window opening, the reflected image forming light beams from said concave mirror producing respective magnified virtual images of said first and second images, wherein the respective screens of said first and second display units are laterally spaced with respect to the vehicle cabin, so that the magnified virtual image of said first image can be viewed from only said first given position and the magnified virtual image of said second image can be viewed from only said second given position.

2. An information display device as claimed in claim 1, wherein each of said first and second display units is a liquid crystal display.

3. An information display device as claimed in claim 1, wherein said first display unit displays an image needed by a front seat passenger and said second display unit displays an image needed by a driver.

4. An information display device as claimed in claim 3, wherein said first and second display units are arranged near opposed lateral edges of said concave mirror.

5. An information display device as claimed in claim 1, further comprising a moving mechanism by which said first display unit is movable in the lateral direction in said housing relative to said second display unit.

6. An information display device as claimed in claim 5, wherein said moving mechanism comprises:

a pair of rails on which said first display unit is slidably disposed; and a drive mechanism for driving said first display unit between first and second positions on said rails, wherein said first position is a position wherein said first display unit is placed above an end portion of the screen of said second display unit, while said second position is a position wherein said first display unit is placed just beside the screen of said second display unit, thereby exposing said end portion of the screen of said second display unit.

7. An information display device as claimed in claim 6, wherein said drive mechanism comprises:

an electric motor;

a speed reduction gear operatively connected to said electric motor;

a pinion mounted on an output shaft of said speed reduction gear;

a rack meshed with said pinion; and a connector connecting said rack with said first display unit.

8. An information display device as claimed in claim 1, wherein the first image and the second image respectively displayed on the first and second display units travel along respective optical paths via only the inclined half mirror and the concave mirror from the first and second display units to the first and second given positions, respectively.

9. In a motor vehicle having an instrument panel at a front portion of a vehicle cabin, and first and second given positions in the vehicle cabin, said first and second given positions being laterally spaced with respect to the vehicle cabin, an information display device comprising:

a housing installed in said instrument panel, said housing having a single window opening which faces toward the vehicle cabin;

a first display unit installed in said housing and having an upward facing screen on which a first image is displayed;

a second display unit installed in said housing and having an upward facing screen on which a second image is displayed;

an inclined half mirror installed in said housing and positioned above both said first and second display units, so that two types of image forming light beams from the respective screens of the first and second display units are reflected toward a front of said vehicle by the half mirror; and a concave mirror installed in said housing to reflect the two types of image forming light beams from said half mirror toward said first and second given positions of said vehicle cabin, respectively, through said single window opening to produce respective magnified virtual images of said first and second images, wherein the reflected two types of image forming light beams from said concave mirror are intersected with each other before reaching to said first and second given positions, and wherein said window opening is sized and arranged so as to permit the magnified virtual images of said first and second images to be viewed from only said first and second given positions, respectively.

10. An information display device as claimed in claim 9, wherein the respective screens of said first and second display units are laterally spaced with respect to the vehicle cabin.

11. An information display device as claimed in claim 9, wherein each of said first and second display units is a liquid crystal display.

12. An information display device as claimed in claim 11, wherein said first and second display units are arranged near opposed lateral edges of said concave mirror.

13. An information display device as claimed in claim 9, further comprising a moving mechanism by which said first display unit is movable in the lateral direction in said housing relative to said second display unit.

14. An information display device as claimed in claim 13, wherein said moving mechanism comprises:

a pair of rails on which said first display unit is slidably disposed; and a drive mechanism for driving said first display unit between first and second positions on said rails, wherein said first position is a position wherein said first display unit is placed above an end portion of the screen of said second display unit, while said second position is a position wherein said first display unit is placed just beside the screen of said second display unit thereby exposing said end portion of the screen of said second display unit.

15. An information display device as claimed in claim 14, wherein said drive mechanism comprises:

an electric motor;

a speed reduction gear operatively connected to said electric motor;

a pinion disposed on an output shaft of said speed reduction gear;

a rack meshed with said pinion; and a connector connecting said rack with said first display unit.

16. An information display device as claimed in claim 9, wherein the reflected two types of image forming light beams travel along respective optical paths via only the inclined half mirror and the concave mirror from the first and second display units to the first and second given positions, respectively.

17. An information display device as claimed in claim 16, wherein the magnified virtual images of said first and second images are capable of being viewed simultaneously from said first and second given positions, respectively.

18. In a motor vehicle having an instrument panel at a front portion of a vehicle cabin and driver's and front passenger's seating positions in the vehicle cabin, an information display comprising:

a housing installed in said instrument panel, said housing having a window opening which faces toward the vehicle cabin;

a first display unit installed in said housing at a position near said driver's seating position, said first display unit having an upward facing screen on which a first image needed by a front seat passenger on said front passenger's seating position is displayed;

a second display unit installed in said housing at a position near said front passenger's seating position, said second display unit having an upwardly facing screen on which a second image needed by a driver on said driver's seating position is displayed;

an inclined half mirror installed in said housing and positioned above both said first and second display units, so that two types of image forming light beams from the respective screens of said first and second display units are reflected toward a front of said vehicle by said half mirror; and a concave mirror installed in said housing to reflect the two types of image forming light beams from said half mirror toward said vehicle cabin through said window opening to produce respective magnified virtual images of the first and second images, wherein the reflected two types of image forming light beams from said concave mirror are intersected with each other before reaching to said front passenger's and driver's seating positions, so that the magnified virtual image of the first image can be viewed from only said front passenger's seating position and the magnified virtual image of the second image can be viewed from only said driver's seating position.

19. An information display device as claimed in claim 18, wherein the reflected two types of image forming light beams travel along respective optical paths via only the inclined half mirror and the concave mirror from the first and second display units to the front passenger's seating position and the driver's seating position, respectively.

20. An information display device as claimed in claim 19, wherein the reflected two types of image forming light beams are capable of being viewed simultaneously from the front passenger's seating position and the driver's seating position, respectively.

* * * * *